United States Patent [19]

Allen

[11] 4,091,069

[45] May 23, 1978

[54] METHOD AND APPARATUS FOR VENTING ENTRAPPED AIR IN MOLD CAVITIES

[75] Inventor: Paul E. Allen, Newtown, Conn.

[73] Assignee: Logic Devices, Inc., Sandy Hook, Conn.

[21] Appl. No.: 769,488

[22] Filed: Feb. 17, 1977

[51] Int. Cl.² ............................................. B29F 1/00
[52] U.S. Cl. ..................................... 264/328; 249/79; 425/546; 425/552; 425/812
[58] Field of Search ............... 425/812, 420, 243, 546, 425/547, 552; 264/101, 102, 328; 249/79, 141

[56] References Cited

U.S. PATENT DOCUMENTS

| 3,078,508 | 2/1963 | Martin, Jr. ................... 425/812 X |
| 3,125,780 | 3/1964 | Harrison et al. ................. 425/243 |
| 3,169,272 | 2/1965 | Maxson ....................... 425/812 X |
| 3,497,173 | 2/1970 | Valyi .............................. 249/79 |
| 3,804,566 | 4/1974 | Kimura et al. ................ 425/812 X |

FOREIGN PATENT DOCUMENTS 1,378,973  10/1964  France ............................ 425/812

*Primary Examiner*—Francis S. Husar
*Assistant Examiner*—William R. Briggs
*Attorney, Agent, or Firm*—Ernest M. Junkins

[57] ABSTRACT

Air that becomes entrapped in a closed mold cavity during the injection of liquid plastic material into the cavity is vented into the flowing liquid coolant of the mold to be exhausted therewith while leakage of coolant into the mold cavity during nonventing is prevented by maintaining the coolant at less than atmospheric pressure.

6 Claims, 8 Drawing Figures

METHOD AND APPARATUS FOR VENTING ENTRAPPED AIR IN MOLD CAVITIES

The present invention relates to the art of plastic molding, and especially injection plastic molding, in which liquid plastic material is forced under pressure into a closed mold cavity to fill the cavity. The material is then cooled and the hardened article removed from the cavity. As the mold cavity is closed, it basically becomes a closed container with air being present in the cavity, and the liquid plastic material, when injected into the mold cavity, displaces the air therein so that the air accordingly must be removed from the cavity. Thus the construction of a plastic mold die requires that some provision be made for enabling the displaced air to be vented from the mold cavity within a satisfactory time. In most instances, such venting is easily and economically effected by fairly standard techniques.

The desired shape of the article and its similarly shaped mold cavity, the desired surface appearance of the finished article, the desired location where the liquid plastic material is injected into the cavity, the desired duration of the molding cycle, etc., may result in a mold cavity in which some of the air to be displaced becomes entrapped in the mold cavity and cannot be vented using standard techniques. One heretofore proposed solution has involved the use of a third part venting structure which may increase the cost of the mold die perhaps 50%. Another solution has been to effect a compromise between the various desires. In any event, the venting of entrapped air in molds has heretofore presented difficulties in the manufacture and use of mold dies.

It is accordingly an object of the present invention to provide a method, a mold die and an apparatus for easily and economically venting air that may become entrapped in a mold cavity during the injection molding of a plastic article.

Another object of the present invention is to achieve the above object with only little or small and inexpensive alterations in a mold die of conventional design.

A further object of the present invention is to achieve the injection molding of plastic articles which had heretofore created difficulties in molding because of entrapped air without any substantial change in heretofore conventional molding techniques or machines.

In carrying out the present invention, where the injection molding of an article could or does effect entrappment of air, the entrapped air is caused to be vented from the cavity by enabling it to pass into the liquid coolant passageway formed adjacent the mold cavity. Liquid coolant is caused to flow in the passageways by a pumping system that effects a pressure difference between the entrance and exit thereof so that the vented air mixes with the liquid coolant to be discharged therewith at the passageway exit. The invention requires the use of a pumping system that maintains a less than atmospheric pressure in the passageway at least where the entrapped air enters, with one form of such a pumping system being disclosed in my copending U.S. Patent application, Ser. No. 733,812, filed Oct. 19, 1976, and entitled "Cooling System for Plastic Molds".

In constructing a mold die, it is generally easily realized that standard techniques will not provide for venting the displaced air so that entrapped air will occur and it is also generally perceivable the area in the mold cavity where the unvented air is apt to become entrapped. The present invention places a venting conduit between this entrappment area and the most convenient access to an adjacent liquid cooling passageway. The conduit thus permits air to be vented into the less than atmospheric pressure in the passageway to be discharged with the liquid coolant. The venting is preferably accomplished through minute openings that may occur for example in porous material such as sintered bronze, small diameter holes or slits on the order of a few thousands of an inch in width, with there being sufficient openings to provide venting in a satisfactory time interval. The small openings minimize both the alteration of the appearance of the surface of the article and interference with ejection of the finished article as the venting openings are of insufficient size to enable the liquid plastic material to flow therein and become hardened.

Other features and advantages will hereinafter appear.

In the drawing

Figure 1:
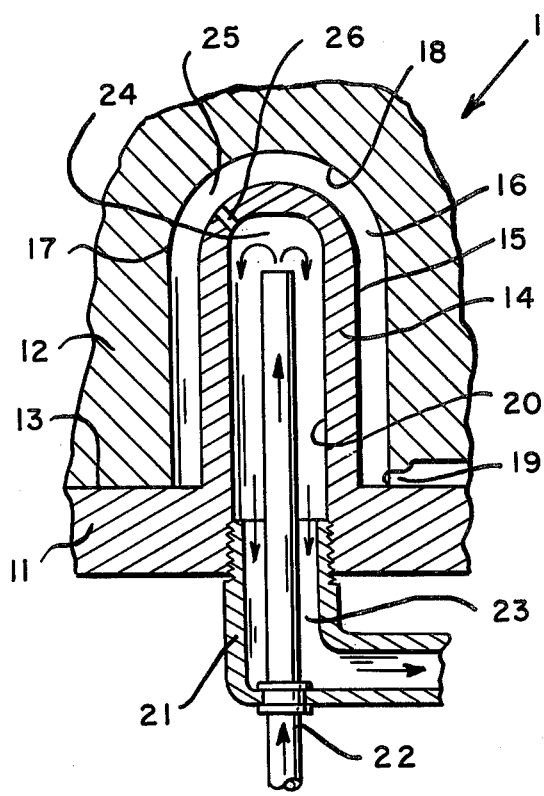
FIG. 1 is a diagrammatic, axial cross-sectional illustration of a venting conduit of the present invention incorporated into a typical mold die of the type in which entrapped air had heretofore created difficulties.

Referring to the drawing, reference numeral 10 indicates a portion of a mold die formed with a movable part 11 and a fixed part 12 with the two parts meeting along a parting line 13. The movable part 11 has an upstanding cylindrical plug 14 defining an inner surface 15 of a mold cavity 16. The fixed part 12 has a recess 17 that defines the outer surface 18 of the mold cavity 16. Formed in one or both of the parts is a liquid plastic injection gate 19 through which liquid plastic material under pressure is forced to flow into the mold cavity to fill same and when the plastic material has cooled, constitute the finished article having a shape that approximates the shape of the mold cavity 16.

As with most injection mold dies, cooling of the plastic material to decrease its solidification time is effected by liquid coolant passageways which enable liquid to flow through one or both of the parts and extract heat from the plastic material. The configuration and shape of these passageways is dependent on many factors including the skill of the mold die designer but in most instances portions thereof are generally adjacent one or both of the cavity's surfaces 15 and 18.

In the example of the liquid coolant passageway herein shown, the plug 14 has an interior hole 20 drilled therein to which is threadingly secured a commercially available "bubbler" 21. The bubbler has a central tube or entrance 22 for conducting liquid coolant towards the end of the hole 20, a peripheral exit 23 for conducting coolant away from the plug and a common bight portion 24.

In the molding of a plastic article, the two parts 11 and 12 are forced together and liquid plastic material is forced under a pressure of perhaps 5000 p.s.i. through the injection gate 19 into the lower portion of the mold cavity 16. The plastic material will begin filling the cavity by flowing both vertically and horizontally. At the begining of the filling, air contained within the cavity may escape or be vented through the parting line 13 but after the plastic material has flowed completely around the bottom of the cavity, this venting route becomes blocked. Injection of further plastic material causes the remaining air to be compressed in an area of the cavity, such as the area indicated by the reference numeral 25. As the mold is closed, there is no way for the air to escape and it thus becomes trapped in this area. If this entrapped air is not removed, it could cause production of articles having voids, gas burns, etc., which generally render the articles unsatisfactory and also perhaps cause damage to the mold die.

To vent the entrapped air, the present invention provides an air vent conduit 26 between the area 25 of the entrappment and the liquid coolant passageway, with the latter connection being preferably to the most conveniently located portion of the passageway, which specifically herein is the bight portion 24. The vented air, when in the coolant passageway, is then withdrawn from the mold die with the liquid coolant as both are discharged through the exit 23. Plastic material may then completely fill the cavity to form a satisfactory article.

Figure 2:
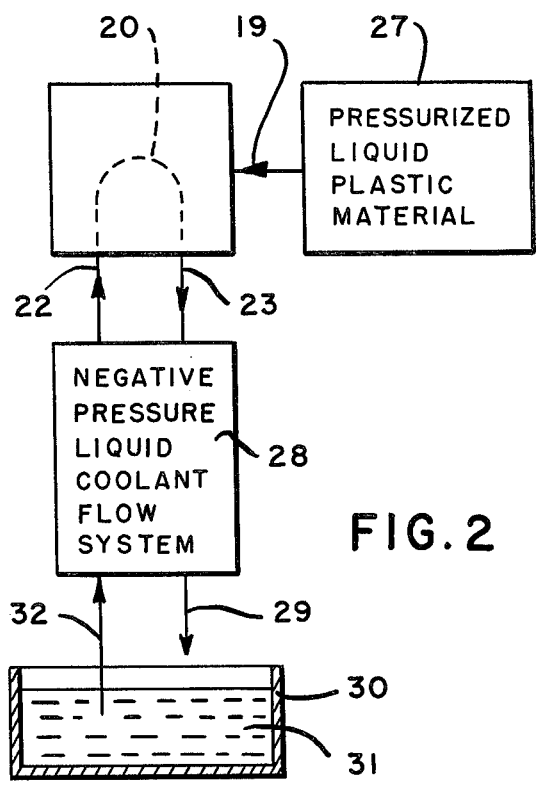
FIG. 2 is a block diagram of the molding apparatus of the present invention.

The mold die 10 is interconnected during the molding operation in the apparatus shown in FIG. 2. The gate 19 is connected to a source of pressurized liquid plastic material 27. The entrance 22 and exit 23 of the liquid coolant passageway are connected to a negative pressure liquid coolant flow system 28, with one form thereof being that disclosed in my above-noted application and which is commercially available from Logic Devices, Inc., Sandy Hook, Conn. 06482. The flow system 28 has a discharge 29 that directs coolant into an open reservoir 30 having a source of liquid coolant 31. The coolant 31 is withdrawn from the reservoir by the flow system 28 and into the passageways for flowing through the mold die by way of a suction pipe 32.

The flow system generally maintains a pressure of the liquid coolant, throughout the passageway, from its entrance 22 to its exit 23, which is less than atmospheric pressure by the system producing a greater suction pressure at the exit 23 than at the entrance 22. This difference in pressure dictates the flow of the liquid coolant into the entrance, through the passageway and out the exit. In accordance with the present invention, however at least the portion of the passageway connected to the air vent conduit 26 must be maintained at a less than atmospheric pressure. This negative head prevents liquid coolant from flowing through the air vent conduit 26 into the mold cavity 16 which would produce undesirable finished articles whenever entrapped air is not being vented. The negative head is not especially required for inducing the flow of entrapped air into the air vent conduit 26 as the entrapped air is generally at a greater than atmospheric pressure.

Figure 3:
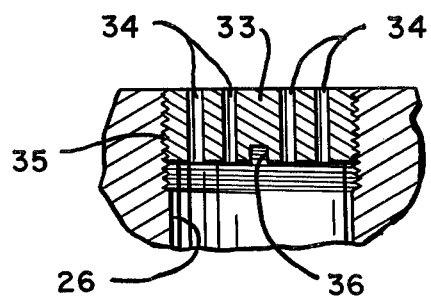
FIG. 3 is a cross-section of one embodiment of an end portion of the venting conduit.
Figure 4:
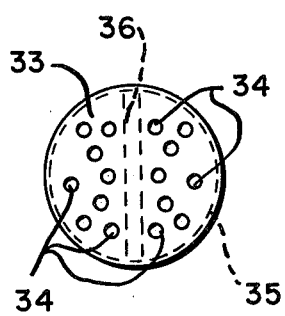
FIG. 4 is an end view of the conduit shown in FIG. 3.

The air vent conduit opening forms a portion of the surface of the mold cavity and is in contact with the liquid plastic material. The present invention minimizes the deleterious effects of the opening by providing a plurality of air passages at the end of the opening with the passages having a minimum dimension on the order of 0.0005 to 0.007 inches. Generally liquid plastic material will not flow into openings having such a dimension. One embodiment of a passage forming member is shown in FIGS. 3 and 4 and consists of an insert 33 formed with a plurality of through holes 34 positioned within the conduit at the mold cavity. Each hole has a diameter within the above-noted range. Thus entrapped air may flow through the holes 34 but the plastic material will not flow therein which minimizes the effect on the surface of the finished article. Moreover, by not having plastic material enter into the air vent conduit, the conduit can neither become blocked by hardened plastic material nor interfere with the ejection of the finished article.

The insert 33 may be maintained in the conduit in any desired manner such as a threaded connection 35 and a screwdriver slot 36, or by a force fit or by the use of securing material, such as welding, etc.

Figure 5:
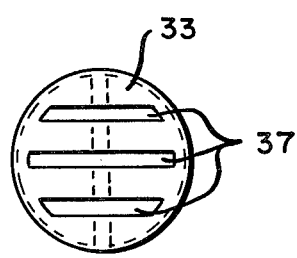
FIG. 5 is an end view similar to FIG. 4 of another embodiment.
Figure 6:
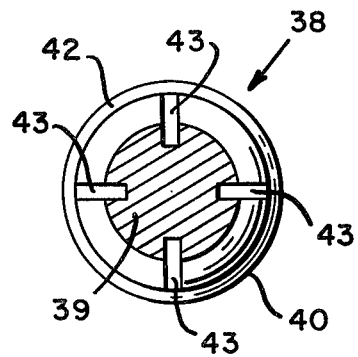
FIG. 6 is an end view similar to FIG. 4 of a further embodiment.

Instead of holes 34, the insert 33 may be formed with through slits 37 as shown in the FIG. 5 embodiment or be formed of porous metal such as shown in the FIG. 6 embodiment with one example thereof being sintered iron.

Figures 7, 8:
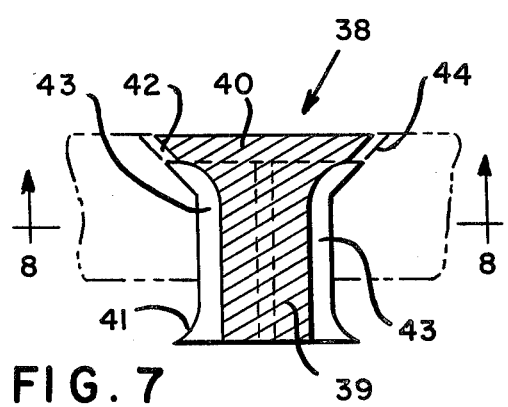
FIG. 7 is a section, similar to FIG. 3, of a further embodiment of the venting conduit, somewhat enlarged.
FIG. 8 is a section, taken on the line 8—8 of FIG. 7.

Another air passage insert is shown in FIGS. 7 and 8 and consists of member 38 having a shank 39 positioned within the conduit, a frusto-conical head 40 and an upset end 41. The head is formed with a peripheral groove 42 at its outer portion having a depth within the above-noted range and a plurality of slots 43 communicating therewith and extending downwardly along the shank. The conduit is flared, as at 44, to closely mate with the remainder of the head 40. Air may thus be vented into the groove 42 and through the slots 43 into the liquid coolant passageways. Preferably the length of the shank is greater than the length of the conduit so that the member 38 may move with respect to the opening and provide some self-cleaning action.

The size of the conduit and extent of the inserts are selected to provide venting of the entrapped air within a time that preferably does not increase the time required to inject the liquid plastic material so that the material flows as if no air is trapped, thereby preventing an increase in the molding cycle time. Moreover, while only one venting conduit has been shown, more than one may be employed if desired. Further while only one area of entrapped air has been disclosed, if the shape of the article could cause more than just one area of entrappment, a vent conduit 25 is interconnected to each independent entrappment area. It should be noted that the air becomes entrapped in an area of the cavity which is the last to be filled by the plastic material and hence is a location that is generally remote from the location of the gate 19.

Whether the venting conduit opening is positioned on the inner or outer surface of the mold cavity generally depends on the convenience in forming the conduit. However, such a choice may not be available if it is desired that the blemish on the surface of the finished article caused by the opening, occur on a specific surface thereof with said surface being that surface which minimizes the distraction of the blemish from the appearance of the finished article.

It will accordingly be understood that there has been disclosed a method, mold die and molding apparatus for removing air that may be entrapped in an injection mold cavity during the molding operation. The invention forms the mold die to have an air vent conduit communicating the area when air would become entrapped in the cavity and the liquid coolant passageway formed in the die. By maintaining the pressure of the liquid coolant at least than atmospheric pressure, leakage of coolant through the conduit is prevented. Additionally, by limiting the portion of the conduit that contacts the liquid plastic material to only small area openings, the plastic material is prevented from entering the conduit.

Variations and modifications may be made within the scope of the claims and portions of the improvements may be used without others.

I claim:

1. The method of molding a plastic article comprising the steps of providing a mold die having a closed cavity shaped substantially like the article and having an inlet to said cavity, injecting liquid plastic material into the cavity through said inlet in a manner which causes entrappment of the air present in the cavity to be concentrated in an area of the cavity, flowing liquid coolant through the mold adjacent the cavity, venting the area of the cavity having the entrapped air to the liquid coolant and maintaining the pressure of the flowing coolant at least where the entrapped air is vented at a pressure that is less than atmospheric pressure.

2. The invention as defined in claim 1 in which the step of venting includes the step of providing air passages into which the liquid plastic material is incapable of flowing.

3. A molding apparatus for use in the forming of an article by the injection of plastic material into a cavity comprising a mold having means for defining a closed cavity having an inlet means associated with said inlet for forcing plastic material in a liquid state into the cavity, through said inlet, means for defining a liquid coolant passageway in said mold adjacent the cavity and air venting means interconnected between the coolant passageway and the cavity with said venting means being located in the cavity remote from said inlet for venting entrapped air from the cavity into the passageway; and pumping means connected to the coolant passageway means for flowing liquid coolant therethrough with said pumping means maintaining the pressure in the passageways at least at the venting means interconnection at a pressure less than atmospheric pressure.

4. The invention as defined in claim 3 in which the cavity includes an area that is the last to be filled with the plastic material to be where air becomes entrapped and in which the air venting means is located to be in communication with said area.

5. The invention as defined in claim 4 in which the air venting means includes means for forming air passages of restricted size at least where the air venting means communicates with the cavity.

6. The invention as defined in claim 5 in which the means forming the restricted air passages has a surface which is contacted by the liquid plastic material.

* * * * *